United States Patent Office 3,563,987
Patented Feb. 16, 1971

3,563,987
PREPARATION OF CYANURIC ACID
Sidney Berkowitz, Highland Park, N.J., assignor to FMC Corporation, a corporation of Delaware
No Drawing. Filed Apr. 1, 1969, Ser. No. 812,334
Int. Cl. C07d 55/36
U.S. Cl. 260—248  6 Claims

ABSTRACT OF THE DISCLOSURE

A highly-pure cyanuric acid is produced by heating urea or biuret in an inert solvent therefor, at temperatures of at least about 180° C., and preferably about 200–250° C., under subatmospheric pressures of from 0 to about 250 mm. of Hg; the cyanuric acid is recovered as a solid precipitate from the urea or biuret solvent substantially free of amides of cyanuric acid.

BACKGROUND OF THE INVENTION

(A) Field of the invention

The invention relates to a novel process for producing cyanuric acid by prolytic conversion of urea or biuret.

(B) Description of the prior art

It is known that cyanuric acid can be produced by the pyrolysis of urea. This reaction may be expressed by the equation:

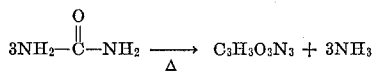

The resulting product, cyanuric acid, which has the empirical formula, $C_3H_3O_3N_3$, is generally represented structurally either as:

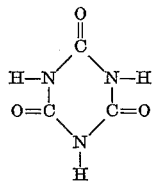

or

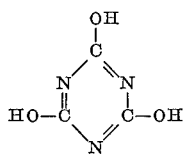

The pyrolysis can be carried out either in a dry state, that is, in the absence of a solvent, such as is described in U.S. Pat. 2,943,088, issued to R. H. Westfall on June 28, 1960, or in the presence of various organic solvents, such as described in U.S. Pat. 3,065,233, issued to Hopkins et al. on Nov. 20, 1962; U.S. Pat. 3,117,968, issued to Merkel et al., on Jan. 14, 1964; U.S. Pat. 3,164,591, issued to Walles et al. on Jan. 5, 1965; or, British Pat. 950,826, issued to Whiffen & Sons, Limited, on Feb. 26, 1964.

Unfortunately, the pyrolysis of urea to cyanuric acid does not occur alone. A large range of products, in addition to cyanuric acid, is produced. These products may include the amino substituted cyanuric acids, commonly referred to as amides of cyanuric acid, namely ammelide, ammeline and melamine, as well as other undesirable side-products, such as ammonium carbonate, melam and other condensation products.

One major difficulty in producing cyanuric acid by pyrolyzing urea or biuret is that vast numbers of side-products can be produced, and it is difficult to control the reaction so as to minimize the production of these undesired side-products. In addition, it is difficult to obtain the desired end product in good yield and in a purified form. High purity is especially important where the cyanuric acid is to be chlorinated, since it is essential, if satisfactory, chlorinated cyanuric acids are to be obtained, that a pure cyanuric acid be used as the raw material. Hence, it is necessary to obtain a commercial product essentially free of other pyrolytic, degradation products of urea, and particularly of the amides of cyanuric acid, chiefly ammelide and ammeline.

In order to obtain a purified cyanuric acid, it is the custom in the art to treat crude cyanuric acid to an acid digestion. In this stage, the crude cyanuric acid is digested in a strong, acid bath, e.g., 3–15% sulfuric or hydrochloric acid. This acid treatment selectively hydrolyzes the acid-soluble, cyanuric acid amides, i.e., ammelide and ammeline, and converts them to cyanuric acid. In general, an acid digestion step is required where the concentration of ammelide or ammeline exceeds 1% by weight of the cyanuric acid product.

OBJECTS OF THE INVENTION

It is an object of the present invention to describe a process in which urea or biuret are converted selectively to cyanuric acid containing minimal amounts of impurities.

It is a further object of the present invention to describe a process that produces cyanuric acid in such a highly-purified state, substantially free of cyanuric acid amides, that acid digestion of the cyanuric acid product is not required.

It is a further object of the present invention to describe a process which converts urea or biuret to cyanuric acid in high yields and in which the cyanuric acid can be recovered readily.

These and other objects will be apparent from the following disclosure.

SUMMARY OF THE INVENTION

It has now been found that urea or biuret can be converted selectively to cyanuric acid with minimal amounts of cyanuric acid amides by heating urea or biuret, in an inert solvent therefor, to temperatures of at least about 180° C., and preferably about 200–250° C., under subatmospheric pressures of from about 0 to about 250 mm. of Hg; the inert solvent must readily dissolve urea or biuret, but must have only a limited solubility for cyanuric acid, and further must have a boiling point of at least about 180° C. at pressures up to about 250 mm. of Hg.

DESCRIPTION OF THE INVENTION AND THE PREFERRED EMBODIMENTS

In carrying out the present invention, urea or biuret are dissolved in a suitable solvent. In order to be acceptable, the solvent must be capable of dissolving urea or biuret in substantial quantities, and the final product, cyanuric acid, must be relatively insoluble therein. Additionally, the solvent must boil at temperatures of now lower than about 180° C. at pressures of 250 mm. of Hg, or less, and must not chemically react with urea, biuret or cyanuric acid. Further, it is desirable that the solvent not form more than one liquid phase in use.

The solvent containing the dissolved urea is then heated to temperatures of at least 180° C., and preferably to temperatures of from 200–250° C. During this heating stage, the solution must be maintained at a subatmospheric pressure of from about 0 to about 250 mm. of Hg. It is essential that this subatmospheric pressure be maintained over the heated solution while the urea or biuret are being converted completely to cyanuric acid. Under these subatmospheric conditions, a highly-selective conversion of urea or biuret to cyanuric acid unexpectedly occurs. It is selective in that the reaction favors the formation of cyanuric acid without producing material amounts of the amides of cyanuric acid, particularly ammelide and ammeline. At these temperatures and pressures the amount of ammelide or ammeline which is produced in the final reaction product is normally no greater than 1%. Further, depending upon the solvent utilized, the conversion of urea to cyanuric acid can be substantially complete, with yields as high as 97% by weight being easily obtained.

After the reaction has been terminated, the cyanuric acid remains as a precipitate in the urea or biuret solvent. The cyanuric acid can be separated readily from the solvent by simple filtration or by any other known separatory means. The separated, cyanuric acid precipitate is then washed with a suitable solvent, e.g., water, in order to remove any last traces of solvent remaining on the filtered cyanuric acid. The washed, cyanuric acid product which is recovered normally is at least 99% pure, and any ammelide or ammeline impurity is not present in amounts greater than 1% by weight.

The highly-selective nature of the present process in producing cyanuric acid containing minimum amounts of amide impurities is extremely important in commercial manufacture. The lack of amide impurities obviates the need for digesting the present, cyanuric acid product in concentrated mineral acid to hydrolyze any ammelide or ammeline impurities to cyanuric acid. Since this digestion step is a relatively long procedure, requiring several hours, and further since it requires special, acid-resistant, holding tanks and centrifuges to hold the acid bath and separate the digested cyanuric acid from the mineral acid, the instant process has a marked advantage over prior art processes by eliminating this costly and time-consuming digestion step.

In the preferred method of operating the present invention, the solvent which is utilized is sulfolane (tetramethylene sulfone), and the conversion takes place at temperatures of from about 200–250° C. The subatmospheric pressures maintained over the solvent during this conversion can range from about 0–250 mm. of Hg, with 100–175 mm. of Hg being preferred. The reaction normally is completed in a period of about two hours, and the percent yield of cyanuric acid which is obtained by such a process is as high as 97%, with the cyanuric acid assay being up to 99.6%.

Solvents which have been found effective in the present process include alkyl sulfones represented by the formula:

wherein $R_1$ and $R_2$ are alkyl groups of 1–6 carbons or groups formed by combining $R_1$ and $R_2$ to form a cyclic sulfone in which the sulfur atom is part of the ring. The compound, tetramethylene sulfone, is a suitable example of a sulfone obtained by combining the $R_1$ and $R_2$ alkyl groups to form a cyclic sulfone. Other suitable solvents include substituted cresols or phenols, where the substituent can be halogen, particularly chlorine or bromine. These include 4-chloro-m-cresol and 2,4-dibromophenol. Another class of suitable solvents includes the N-substituted urethanes and cyclic urethanes where the substituents are phenyl or alkyl groups having 1–6 carbon atoms. An example of these includes 5-methyl-2-oxazolidinone.

The following examples are given to illustrate the invention and are not deemed to be limiting thereof.

EXAMPLE 1

Run 1.—A glass flask equipped with a stirrer, thermometer and reflux condenser was charged with 30 g. (0.5 mole) of urea and 60 g. of sulfolane. The flask was connected to a vacuum source, and the pressure within the flask was maintained at 100 mm. of Hg throughout the resulting run. The solution, with stirring, was heated until it refluxed at 205° C. at 100 mm. of Hg. A precipitate was observed to form after one minute of refluxing. Heating and stirring were continued for a total of 2.5 hours. Thereafter, the sulfone mixture was filtered, and the precipitate was water-washed and dried to yield 21.0 g. of cyanuric acid; this constituted a 97.5% yield, based on the urea charged to the flask. Upon analysis of the product by vapor phase chromatography and by titration with standard sodium hydroxide solution, the product was identified as 99.7% pure cyanuric acid. The remaining impurities in the cyanuric acid product were identified as mainly urea, with only trace amounts of any amides.

Runs 2–8.—The sulfolane filtrate separated from the cyanuric acid product was returned to the flask, and the flask was once again charged with 30 g. of urea. The flask was then heated, and the contents refluxed under subatmospheric pressures of 100 mm. of Hg in exactly the same way as the previous run. The resultant, cyanuric acid product which was recovered is identified as to assay and percent yield in Table I. Additional runs were made using 30 g. charges of urea, and the sulfolane filtrate was obtained during the filtration of preceding runs without any attempt to rectify or purify the sulfolane solvent. The percent yields and assay of cyanuric acid obtained are also listed in Table I.

TABLE I

| Run No.: | Percent yield | Assay of CA (percent) |
|---|---|---|
| 2 | 97.2 | 99.5 |
| 3 | 97.0 | 99.6 |
| 4 | 97.1 | 99.4 |
| 5 | 97.0 | 99.5 |
| 6 | 97.1 | 99.4 |
| 7 | 97.0 | 99.6 |
| 8 | 97.0 | 99.7 |

EXAMPLE 2

Runs 1–6—Process of the invention

The procedure of Example 1, Run 1 was repeated using the same temperatures and pressures as Example 1, except that each run was continued for different total reaction times, as set forth in Table II. The percent yield and assay of cyanuric acid product are set forth in Table II. In determining the assay of the cyanuric acid product from these yields, it was found that the impurities were mainly urea and that ammelide was present only in trace amounts.

TABLE II

| Run No.: | Reaction time (hrs.) | Percent yield CA | Assay, percent |
|---|---|---|---|
| 1 | 0.083 | 41 | [1] 98.0 |
| 2 | 0.25 | 66 | [1] 98.9 |
| 3 | 0.50 | 89 | 99.5 |
| 4 | 1.0 | 95 | 99.6 |
| 5 | 2.0 | 97 | 99.6 |
| 6 | 2.5 | 97 | 99.6 |

[1] Impurities were mainly urea with only trace amounts of ammelide.

Runs A and B—Process of the prior art

The procedure of Example 2 was repeated by heating the sulfolane and urea to 205° C., except that the pressure within the reaction flask was maintained at atmospheric pressure (760 mm. of Hg). In Run A the reaction was run for 2.5 hours, while in Run B the reaction was run for 8 hours. The results of the runs are set forth in Table III. In determining the assay of the product, it was found that the resulting impurities were mainly ammelide, plus trace amounts of biuret and ammeline, as determined by vapor phase chromatographic analysis and by titration with a standard sodium hydroxide solution.

It is believed that Example 2 illustrates the selectivity of the present process when urea is heated under subatmospheric pressures, as set forth in Runs 1–6, compared with heating under atmospheric pressure, as described in Runs A and B. In Runs 1–6 the cyanuric acid product was recovered in yields of up to 97%, and had a purity of 98.0% to 99.6% with only trace amounts of amide impurities, indicating that the urea was being converted selectively to cyanuric acid and not to ammelide. By contrast in Runs A and B, where the reaction was run under substantially atmospheric pressures, the assay of cyanuric acid was only 87.8%, and the remainder of the impurities was mainly ammelide, indicating a nonselective conversion of urea to cyanuric acid.

TABLE III

| | Reaction time (hrs.) | Percent yield CA | Assay, percent |
|---|---|---|---|
| Run No.: | | | |
| A | 2.5 | 39.1 | [1] 87.8 |
| B | 8.0 | 86.5 | [1] 87.9 |

[1] Impurities were mainly ammelide plus small amounts of biuret and ammeline.

EXAMPLE 3

A 500 ml., 3-necked flask equipped with a stirrer, thermometer and reflux condenser was charged with 30 g. (0.5 mole) of urea and 60 g. of 4-chloro-m-cresol. The flasks was connected to a vacuum source, and the pressure within the flask was maintained at 175 mm. of Hg throughout the resulting run. The solution, with stirring, was heated until it refluxed at 190° C. at 175 mm. of Hg. A precipitate was observed to form after 10 minutes of heating. Heating and stirring were continued for 2.9 hours. Thereafter, the mixture was cooled to 60° C., filtered, and the precipitate was washed and dried to yield 16.5 g. of cyanuric acid; this constituted a 76% yield, based on the urea charged to the flask. The product was identified as 99.5% pure cyanuric acid. The remaining impurities in the cyanuric acid product were found to be free of amides.

EXAMPLE 4

The same procedure and materials were used as set forth in Example 3, except that the reaction was heated to reflux at 180° C. at 105 mm. of Hg, and refluxing was continued for 3.5 hours. The resulting product, after being washed and dried, yielded 13.1 g. of cyanuric acid; this constituted a 61% yield, based on the urea charged to the flask. The product was identified as 99.7% pure cyanuric acid by vapor phase chromatography and by titration with standard sodium hydroxide solution. No ammelide or ammeline impurity was detected in the product.

EXAMPLE 5

A glass flask equipped with a stirrer, thermometer and reflux condenser was charged with 51.5 g. of biuret and 103 g. of sulfolane. The flask was connected to a vacuum source, and the pressure within the flask was maintained at 100 mm. of Hg throughout the resulting run. The solution, with stirring, was heated until it refluxed at 205° C. at 100 mm. of Hg. Heating and stirring were continued for 2 hours. Thereafter, the mixture was filtered, and the precipitae was washed and dried to yield 41.8 g. of cyanuric acid; this constituted a 97% yield, based on the biuret charged to the flask. Upon analysis of the product by vapor phase chromatography and by titration with standard sodium hydroxide solution, the product was identified as 99.7% pure cyanuric acid. No ammelide or ammeline impurity was found in the product.

EXAMPLE 6

A 500 ml., 3-necked flask equipped with a stirrer, thermometer and reflux condenser was charged with 30 g. (0.5 mole) of urea and 60 g. of 5-methyl-2-oxazolidinone. The flask was connected to a vaccum source, and the pressure within the flask was maintained at 100 mm. of Hg throughout the resulting run. The solution, with stirring, was heated continuously at 210° C. at 100 mm. of Hg. Heating and stirring were continued for 2.5 hours. Thereafter, the mixture was cooled to 25° C., filtered, and the precipitae was washed and dried to yield 12.8 g. of cyanuric acid; this constituted a 60% yield, based on the urea charged to the flask. The product was identified as 99.5% pure cyanuric acid. The remaining impurities in the cyanuric acid product were found to be free of amides.

EXAMPLE 7

A 500 ml., 3-necked flask equipped with a stirrer, thermometer and reflux condenser was charged with 30 g. (0.5 mole) of urea and 60 g. of 3-methylsulfolane. The flask was connected to a vacuum source, and the pressure within the flask was maintained at 100 mm. of Hg throughout the resulting run. The solution, with stirring, was heated until it refluxed at 205° C. at 100 mm. of Hg. Heating and stirring were continued for 2 hours. Thereafter, the mixture was cooled to 25° C., filtered, and the precipitate was washed and dried to yield 20.0 g. of cyanuric acid; this constituted a 93% yield, based on the urea charged to the flask. The product was identified as 99.8% pure cyanuric acid. The remaining impurities in the cyanuric acid product were found to be free of amides.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure otherwise than as specifically described and exemplified herein.

What is claimed is:

1. Process for the production of a substantially pure cyanuric acid comprising heating a compound selected from the group consisting of urea and biuret in an inert solvent to temperatures of at least about 180° C. under subatmospheric pressures of from about 0–250 mm. of Hg.

2. Process of claim 1 wherein said heating is conducted at temperatures of from about 200–250° C.

3. Process of claim 1 wherein the solvent is sulfolane.

4. Process of claim 1 wherein the starting compound is urea.

5. Process of claim 1 wherein the subatmospheric pressures are from about 100 to about 175 mm. of Hg.

6. Process of claim 1 wherein the solvent is 3-methylsulfolane.

References Cited

UNITED STATES PATENTS

| 3,051,708 | 8/1962 | Merkel et al. | 260—248 |
| 3,107,244 | 10/1963 | Robertson | 260—248 |
| 3,394,136 | 7/1968 | Moore et al. | 260—248 |
| 3,415,822 | 12/1968 | Elliott et al. | 260—248 |

JOHN M. FORD, Primary Examiner